: US 9,789,825 B2
: Oct. 17, 2017

(12) United States Patent
Cha et al.

(54) BICYCLE CARRIER SYSTEM FOR VEHICLE

(71) Applicant: Hyundai Motor Company, Seoul (KR)

(72) Inventors: Dong Eun Cha, Suwon-si (KR); Hyun Gyung Kim, Hwaseong-si (KR); Jin Young Yoon, Gimpo-si (KR); Seung Mok Lee, Osan-si (KR); Soo Hyun Hyun, Gyeongju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/814,150

(22) Filed: Jul. 30, 2015

(65) Prior Publication Data

US 2016/0288729 A1 Oct. 6, 2016

(30) Foreign Application Priority Data

Apr. 3, 2015 (KR) .................. 10-2015-0047711

(51) Int. Cl.
*B60R 9/10* (2006.01)
*B60R 9/06* (2006.01)
*B60R 19/02* (2006.01)

(52) U.S. Cl.
CPC .................. *B60R 9/10* (2013.01); *B60R 9/06* (2013.01); *B60R 19/023* (2013.01)

(58) Field of Classification Search
CPC ........... B60R 9/06; B60R 9/10; B60R 19/023; B60R 19/02
USPC ................................................ 224/491, 924
See application file for complete search history.

(56) References Cited

U.S. PATENT DOCUMENTS

| 1,482,770 | A | * | 2/1924 | Terrell | ............... B60R 9/06 224/497 |
| 1,849,046 | A | | 3/1932 | Arndt | |
| 1,904,114 | A | | 4/1933 | Ambrosius | |
| 1,941,375 | A | | 12/1933 | Wildman | |
| 3,176,903 | A | * | 4/1965 | Farley | ............... B60R 9/06 224/490 |

(Continued)

FOREIGN PATENT DOCUMENTS

| EP | 0 041 889 A1 | 12/1981 |
| EP | 2 570 305 B1 | 11/2010 |

(Continued)

*Primary Examiner* — Peter Helvey
(74) *Attorney, Agent, or Firm* — Morgan, Lewis & Bockius LLP

(57) ABSTRACT

A bicycle carrier system for a vehicle includes a guide rail provided on a bumper back beam and formed to extend in forward and backward directions, a carrier portion connected to the guide rail to be slidably drawn out or accommodated along the guide rail, an extended support portion installed on the carrier portion to extend or return in both side directions to carry a bicycle, a motor module installed on the carrier portion and including a first driving portion to enable the carrier portion to move along the guide rail and a second driving portion to extend/return the extended support portion, and a communication control module to store a drawing/accommodating command of the carrier portion and an extending/returning command of the extended support portion and to control operation of the first driving portion and the second driving portion in accordance with an input signal.

12 Claims, 6 Drawing Sheets

(56) References Cited

U.S. PATENT DOCUMENTS

| | | | | |
|---|---|---|---|---|
| 5,445,300 | A * | 8/1995 | Eipper | B60R 9/06 224/496 |
| 6,145,720 | A | 11/2000 | Comeau | |
| 7,121,597 | B2 * | 10/2006 | Chuang | B60R 9/06 224/489 |
| 7,806,307 | B2 * | 10/2010 | Bergerhoff | B60R 9/048 224/282 |
| 7,854,358 | B2 * | 12/2010 | Bergerhoff | B60R 9/06 224/281 |
| 7,857,180 | B2 * | 12/2010 | Bergerhoff | B60R 9/06 224/281 |
| 7,909,213 | B2 | 3/2011 | Bergerhoff et al. | |
| 2006/0266754 | A1 | 11/2006 | Carmona | |
| 2007/0102465 | A1 * | 5/2007 | Wezyk | B60R 9/06 224/321 |
| 2008/0006665 | A1 * | 1/2008 | Bergerhoff | B60R 9/06 224/497 |
| 2008/0006667 | A1 * | 1/2008 | Bergerhoff | B60R 9/048 224/533 |
| 2008/0142559 | A1 | 6/2008 | Lim et al. | |
| 2011/0108592 | A1 * | 5/2011 | Lee | B60R 9/06 224/488 |
| 2012/0024923 | A1 | 2/2012 | Cha et al. | |
| 2012/0205413 | A1 * | 8/2012 | Degenstein | B60R 9/06 224/512 |
| 2013/0182454 | A1 * | 7/2013 | Hofmann | B60R 9/10 362/549 |
| 2015/0321620 | A1 * | 11/2015 | Lungershausen | B60R 9/06 224/497 |
| 2016/0052457 | A1 * | 2/2016 | Cha | B60R 9/06 224/489 |
| 2016/0052459 | A1 * | 2/2016 | Cha | B60R 9/06 224/489 |
| 2016/0096482 | A1 * | 4/2016 | Cha | B60R 9/10 224/496 |
| 2016/0096483 | A1 * | 4/2016 | Cha | B60R 9/10 224/496 |
| 2016/0152190 | A1 * | 6/2016 | Lee | B60R 9/10 224/489 |

FOREIGN PATENT DOCUMENTS

| | | |
|---|---|---|
| JP | 2014-97387 A | 5/2014 |
| KR | 10-2007-0026191 A | 3/2007 |
| KR | 10-2009-0003555 A | 1/2009 |
| KR | 10-2011-0034733 A | 4/2011 |
| KR | 10-2011-0035378 A | 4/2011 |
| KR | 10-2011-0050162 A | 5/2011 |
| KR | 10-1040088 B1 | 6/2011 |
| KR | 10-2014-0041647 A | 4/2014 |

* cited by examiner

BICYCLE CARRIER SYSTEM FOR VEHICLE

CROSS-REFERENCE(S) TO RELATED APPLICATIONS

The present application claims priority of Korean Patent Application Number 10-2015-0047711 filed on Apr. 3, 2015, the entire contents of which application are incorporated herein for all purposes by this reference.

BACKGROUND OF THE INVENTION

Field of the Invention

The present invention relates to a bicycle carrier system for a vehicle, which is installed on a rear bumper side of the vehicle to carry one or more of a bicycle and a baggage thereon.

Description of Related Art

Recently, as a bicycle is used as means for leisure activities, the bicycle is carried on a vehicle to move the bicycle to a biking road or to the neighborhood of a mountain. However, since the bicycle generally has a large volume, it is difficult to carry the bicycle in the vehicle even using a trunk or a back seat compartment of the vehicle.

To solve this problem, various schemes for carrying a bicycle out of the vehicle have been proposed. However, in the case of carrying a bicycle through fixing the bicycle to a loop panel of the vehicle, the carrying work itself causes great inconvenience, and the height of the vehicle increasingly causes an accident when the vehicle enters into a tunnel or a building.

In the case of carrying a bicycle at a rear end of a tail gate of the vehicle, it is necessary to install a separate carrier device on the tail gate, causing inconvenience. Further, even normal times when the bicycle is not carried, a carrier device is exposed to an outside to hinder the vehicle exterior design.

In addition, in the case where it is necessary to carry the bicycle on the vehicle, it is required to manually install the carrier device, while in the case where it is not necessary to carry the bicycle, it is required to take away the carrier device to cause lack of convenience in use.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention is directed to a bicycle carrier, which is installed on a rear bumper back beam of a vehicle in a manner that it is not exposed to an outside in normal times, but is drawn from the bumper back beam to enable a bicycle to be carried thereon if it is required to carry the bicycle or the like, so that the exterior design can be maintained and convenience can be improved.

In an aspect, the present invention is directed to a bicycle carrier system for a vehicle, which enables a bicycle carrier to be automatically drawn out or accommodated therein and enables width adjustment of the bicycle carrier in both side directions to be automatically performed to facilitate carriage of the bicycle, so that high quality and convenience can be further improved.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with some embodiments of the present invention, a bicycle carrier system for a vehicle includes: a guide rail substantially symmetrically provided on a bumper back beam and formed to extend in forward and backward directions; a carrier portion connected to the guide rail to be slidably drawn out or accommodated along the guide rail; an extended support portion installed on the carrier portion to extend or return in both side directions and formed to carry a bicycle thereon; a motor module installed on the carrier portion and including a first driving portion connected to the guide rail to enable the carrier portion to move along the guide rail and a second driving portion connected to the extended support portion to extend or return the extended support portion; and a communication control module configured to store a drawing or accommodating command of the carrier portion and an extending or returning command of the extended support portion and to control operation of the first driving portion and the second driving portion in accordance with an input signal in accordance with a specific command.

The communication control module may include: a communication portion configured to output signals in accordance with the drawing or accommodating command of the carrier portion and the extending or returning command of the extended support portion; and a control portion configured to receive the signals output from the communication portion and to selectively control application of a power to the first driving portion and the second driving portion in accordance with the input signal.

The communication control module may further include a first relay portion and a second relay portion provided between the control portion and the first and second driving portions, respectively, to permit or intercept the power that is applied to the first driving portion or the second driving portion in accordance with a command signal of the control portion.

The control portion of the communication control module may control the first relay portion to permit the power that is applied to the first driving portion if the signal in accordance with the drawing or accommodating command of the carrier portion is input through the communication portion and to intercept the power that is applied to the first driving portion if the signal in accordance with the drawing or accommodating command of the carrier portion is not input.

The control portion of the communication control module may control the second relay portion to permit the power that is applied to the second driving portion if the signal in accordance with the extending or returning command of the extended support portion is input and to intercept the power that is applied to the second driving portion if the signal in accordance with the extending or returning command of the extended support portion is not input.

The first driving portion of the motor module may include a first motor portion installed on the carrier portion to transfer a rotating power when the signal of the communication control module is input; and a moving link portion extending from the first motor portion and connected to the guide rail to enable the carrier portion to slide in forward and backward directions along the guide rail when the first motor portion operates.

The extended support portion may include: an extended rail fixedly coupled to the carrier portion and extending to cross the carrier portion in both side directions of the carrier portion; and an extended link portion formed to extend in parallel to the extended rail, connected to be movable along a direction in which the bicycle support extends, and connected to the second driving portion of the motor module so as to enable the bicycle support to move along the extended rail when the second driving portion operates.

A fixing bracket may be fixedly installed to the guide rail, and a tilting bracket is positioned in a rear of the fixing bracket and rotatably installed on the bumper back beam.

A solenoid portion may be provided on the fixing bracket and selectively connected to the tilting bracket to selectively permit a rotating operation of the tilting bracket.

The communication control module may further store a tilting command of the carrier portion, and control operation of the solenoid portion if a signal in accordance with the tilting command is input.

The communication control module may further include a third relay portion configured to permit or intercept the power that is applied to the solenoid portion.

The communication control module may output the signal in accordance with the tilting command of the carrier portion in a state where the carrier portion is completely drawn.

According to the bicycle carrier system for a vehicle of the present invention, since the bicycle carrier is installed on the rear bumper back beam of the vehicle in a manner that the bicycle carrier is not exposed to the outside in normal times, but is drawn from the bumper back beam to enable the bicycle to be carried thereon if it is required to carry the bicycle, the exterior design can be maintained and convenience can be improved.

In particular, since the bicycle carrier is automatically drawn out or accommodated in the bumper back beam and the width of the bicycle carrier is adjusted in both side directions to facilitate the carriage of the bicycle, high quality and convenience can be further improved.

The methods and apparatuses of the present invention have other features and advantages which will be apparent from or are set forth in more detail in the accompanying drawings, which are incorporated herein, and the following Detailed Description, which together serve to explain certain principles of the present invention.

DESCRIPTION OF SPECIFIC EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
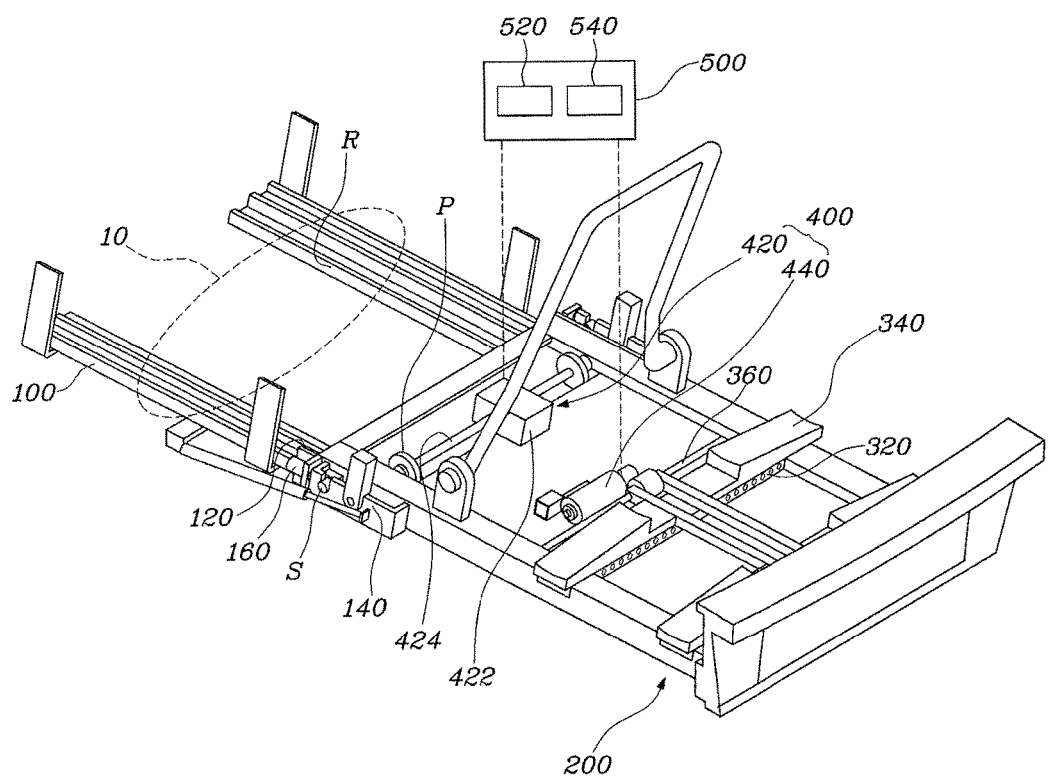
FIG. 1 is a view illustrating the configuration of an exemplary bicycle carrier system for a vehicle in accordance with the present invention.
Figure 2:
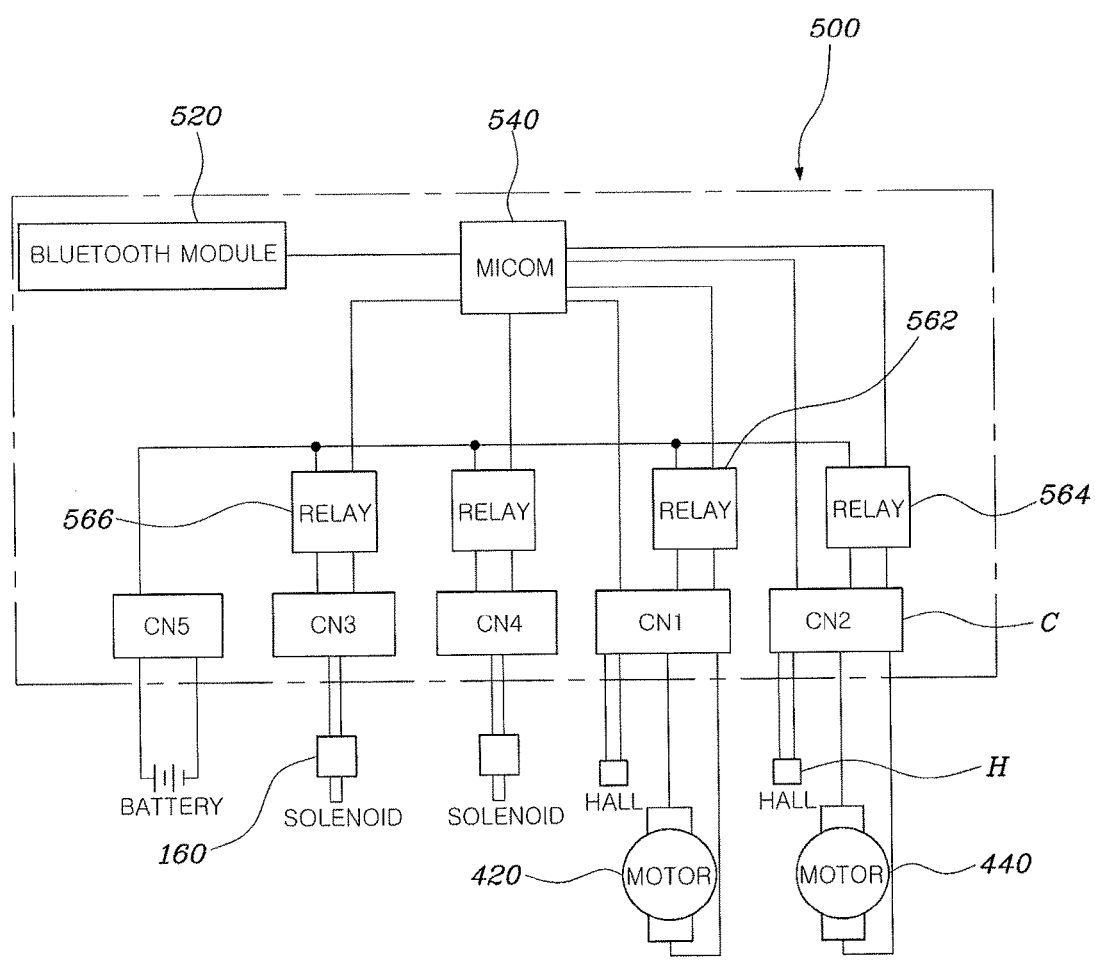
FIG. 2 and FIG. 3 are views explaining the bicycle carrier system for a vehicle illustrated in FIG. 1.
Figure 3:
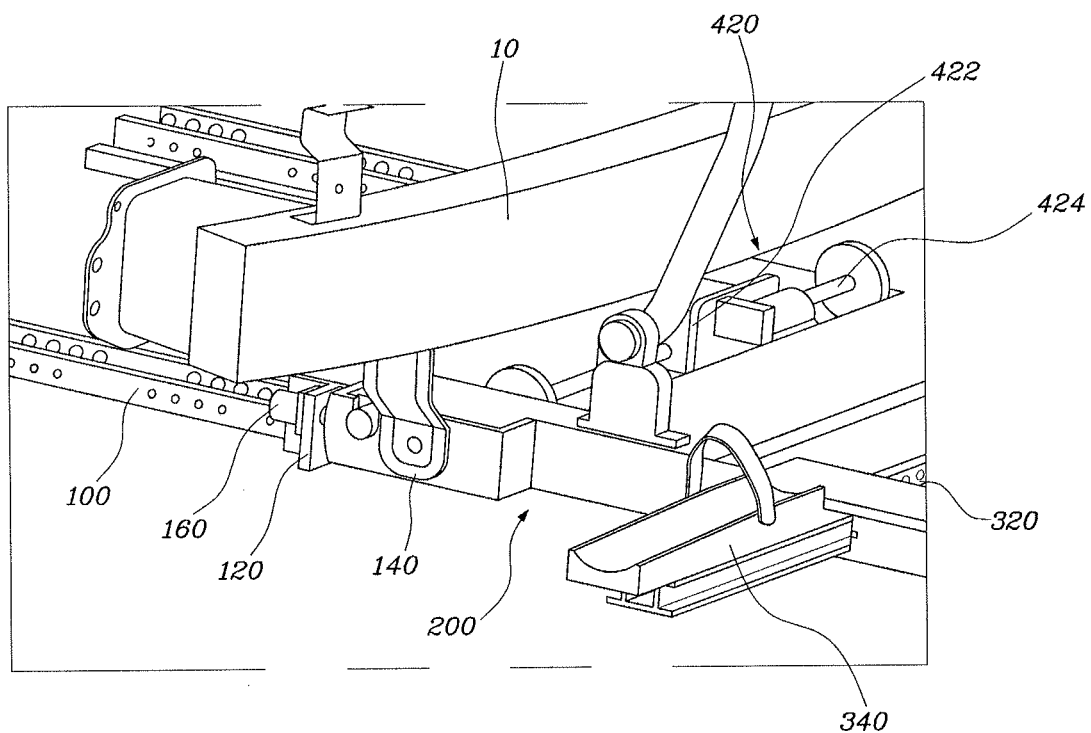
Figure 4:
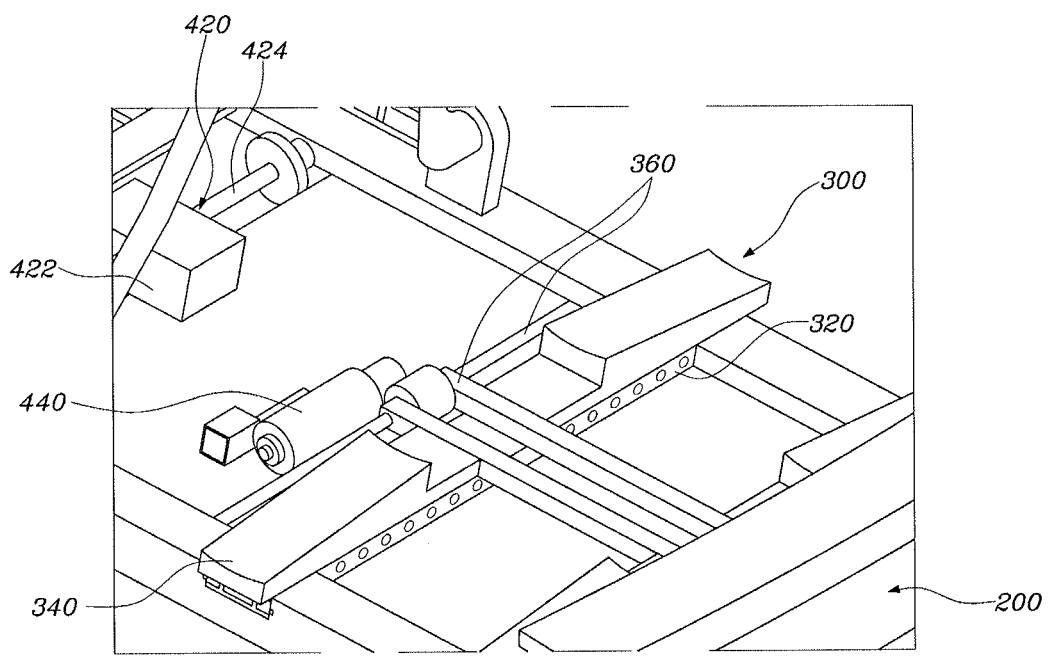
FIG. 4 and FIG. 5 are views explaining an operation state of an exemplary bicycle carrier system for a vehicle in accordance with the present invention.
Figure 5:
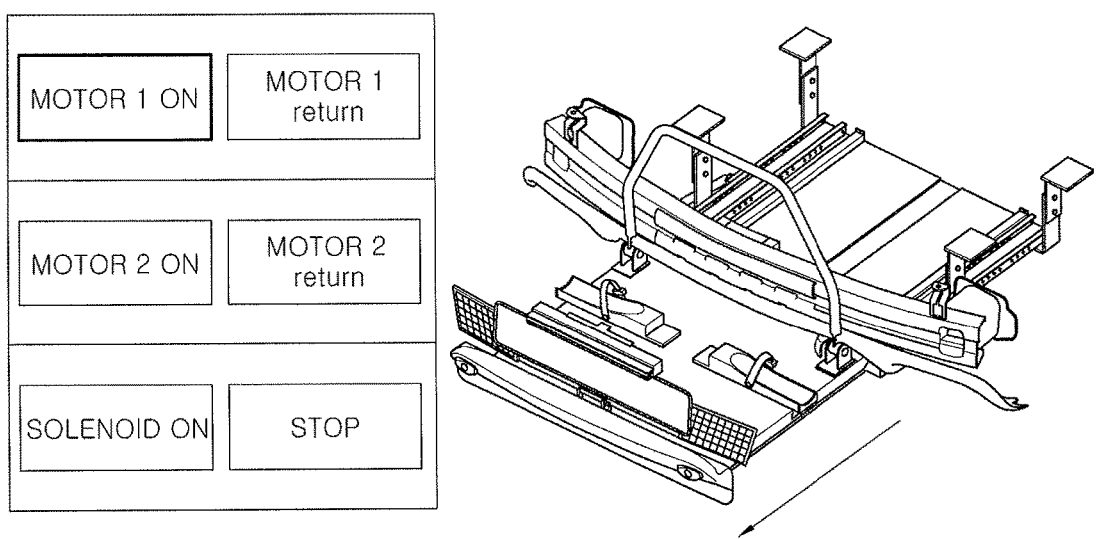
Figure 6:
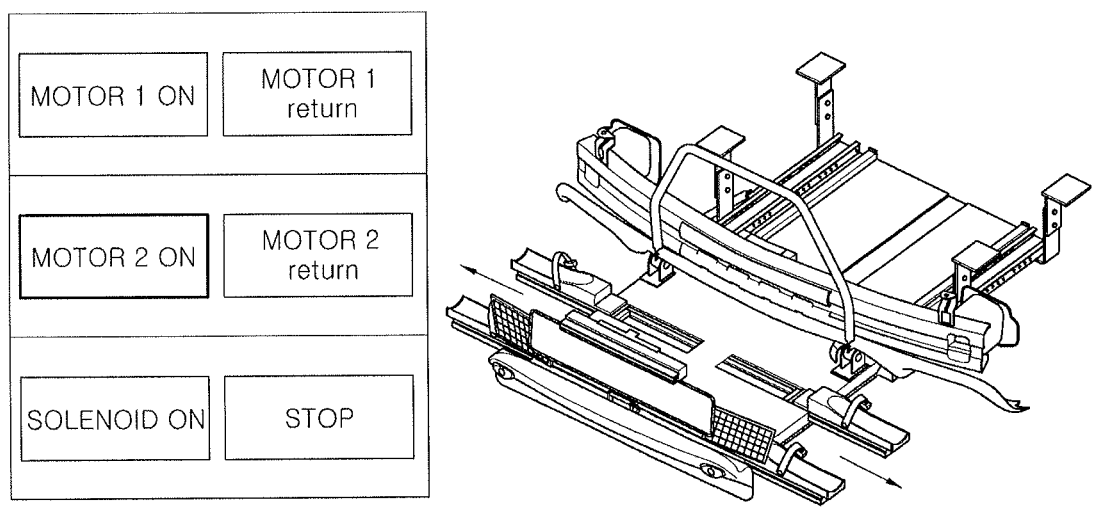
FIG. 6 is a view explaining a communication control module of the bicycle carrier system for a vehicle illustrated in FIG. 1.

FIG. 1 is a view illustrating a bicycle carrier system for a vehicle in accordance with some embodiments of the present invention, and FIGS. 2 and 3 are views explaining the bicycle carrier system for a vehicle illustrated in FIG. 1. FIGS. 4 and 5 are views explaining an operation state of a bicycle carrier system for a vehicle in accordance with some embodiments of the present invention, and FIG. 6 is a view explaining a communication control module of the bicycle carrier system for a vehicle illustrated in FIG. 1.

As illustrated in FIG. 1, a bicycle carrier system for a vehicle in accordance with the present invention includes a guide rail 100 symmetrically or substantially symmetrically provided on a bumper back beam 10 and formed to extend in forward and backward directions, a carrier portion 200 installed to be connected to the guide rail 100 and to be slidably drawn out or accommodated along the guide rail 100, an extended support portion 300 installed on the carrier portion 200 to extend and spread in both side directions and to extend and return and formed to carry a bicycle thereon, a motor module 400 installed on the carrier portion 200 and including a first driving portion 420 connected to the guide rail 100 to enable the carrier portion 200 to move along the guide rail 100 and a second driving portion 440 connected to the extended support portion 300 to enable the extended support portion 300 to extend and spread, and a communication control module 500 configured to store a drawing/accommodating command of the carrier portion 200 and an extending/returning command of the extended support portion 300 and to enable the first driving portion 420 and the second driving portion 440 to selectively operate in accordance with a signal that is input in accordance with a specific command.

The bicycle carrier in accordance with some embodiments of the present invention may be installed on the bumper back beam 10 in the rear of the vehicle, and may be configured to be drawn out from or accommodated in the bumper back beam 10 or to be drawn out from or accommodated in a lower side of the bumper back beam 10. After the carrier portion 200 is drawn out, the extended support portion 300 extends and spreads in the side direction to enable the bicycle to be carried thereon. The carrier portion 200 can be tilted to facilitate the use of the bicycle carrier.

In particular, in accordance with some embodiments of the present invention, the first driving portion 420 that enables the carrier portion 200 to move and the second driving portion 440 that enables the extended support portion 300 to move are controlled to operate by the communication control module 500, and the communication control module 500 selectively operates the first driving portion 420 and the second driving portion 440 in accordance with a user's specific command to make the carrier portion 200 drawn out or accommodated or to make the extended support portion 300 extend or return.

Through this, when the bicycle carrier is used, a user may input a simple command to automatically draw or accommodate the bicycle carrier or to extend or return the bicycle carrier to match the width of the bicycle in a state where the bicycle carrier is drawn out, and thus convenience can be secured.

Specifically, in some embodiments such as those shown in FIG. 2, the communication control module 500 may include a communication portion 520 configured to output signals in accordance with the drawing/accommodating command of the carrier portion 200 and the extending/returning command of the extended support portion 300, and a control portion 540 configured to receive the signals output from the communication portion 520 and to operate to selectively apply a power to the first driving portion 420 and the second driving portion 440 in accordance with the input signals.

That is, the communication portion 520 outputs a signal in accordance with the user command to transfer the signal to the control portion 540. As the communication portion 520, a wireless communication means may be used, and representatively, Bluetooth may be adopted. The communication portion 520 may adopt a separate remote controller for inputting the drawing/accommodating command of the carrier portion 200 and the extending/returning command of the extended support portion 300 in accordance with user's intention. If a specific command is input, the communication portion 520 outputs a signal in accordance with the corresponding command and transfers the signal to the control portion 540.

The control portion 540, which has received the signal in accordance with the command from the communication portion 520, applies the power to the first driving portion 420 or the second driving portion 440 in accordance with the input signal to draw or accommodate the carrier portion 200 or to extend or return the extended support portion 300.

For this, the communication control module 500 may further include a first relay portion 562 and a second relay portion 564 provided between the control portion 540 and the first and second driving portions 420 and 440, respectively, to permit or intercept the power that is applied to the first driving portion 420 or the second driving portion 440 in accordance with a command signal of the control portion 540.

Specifically, in some embodiments such as those illustrated in FIG. 5, the communication control module 500 includes the communication portion 520 that receives the user command and transfers a signal in accordance with the corresponding command and the control portion 540 that receives the signal output from the communication portion 520. The control portion 540 is connected to the first relay portion 562 and the second relay portion 564 and transfers the command signal to the relay portions.

Here, the first relay portion 562 and the second relay portion 564 are connected to the first driving portion 420 and the second driving portion 440, respectively, and permit or intercept the power that is transferred from a battery to the first driving portion 420 and the second driving portion 440 in accordance with the command signal that is transferred from the control portion 540. In addition, the communication control module 500 may include connectors C through which the control portion 540 is connected to the first relay portion 562 and the second relay portion 564.

Through this, the control portion 540 of the communication control module 500 may control the first relay portion 562 to permit the power that is applied to the first driving portion 420 if the signal in accordance with the drawing or accommodating command of the carrier portion 200 is input through the communication portion 520 and to intercept the power that is applied to the first driving portion 420 if the signal in accordance with the drawing or accommodating command of the carrier portion 200 is not input.

That is, as illustrated in FIG. 5, if the signal in accordance with the drawing command of the carrier portion 200 is input, the control portion 540 controls the first relay portion 562 to permit the power that is applied to the first driving portion 420, and controls the first driving portion 420 to rotate in a forward direction to move the carrier portion 200 in the drawing direction. If the signal in accordance with the accommodating command is input, the control portion 540 operates to apply the power to the first driving portion 420 and controls the first driving portion 420 to rotate in a reverse direction to move the carrier portion 200 in the accommodating direction. Here, both the drawing command and the accommodating command of the carrier portion 200 are not input, the control portion 540 controls the first relay portion 562 to intercept the power that is applied to the first driving portion 420, and thus the movement of the carrier portion 200 is stopped.

On the other hand, the control portion 540 of the communication control module 500 may control the second relay portion 564 to permit the power that is applied to the second driving portion 440 if the signal in accordance with the extending or returning command of the extended support portion 300 is input and to intercept the power that is applied to the second driving portion 440 if the signal in accordance with the extending or returning command of the extended support portion 300 is not input.

That is, as illustrated in FIG. 6, if the signal in accordance with the extending command of the extended support portion 300 is input, the control portion 540 controls the second relay portion 564 to permit the power that is applied to the second driving portion 440, and controls the second driving portion 440 to rotate in a forward direction to move the extended support portion 300 in the extending direction. If the signal in accordance with the returning command is input, the control portion 540 operates to apply the power to the second driving portion 440 and controls the second driving portion 440 to rotate in a reverse direction to move the extended support portion 300 in the returning direction. Here, both the drawing command and the accommodating command of the extended support portion 300 are not input, the control portion 540 controls the second relay portion 564 to intercept the power that is applied to the second driving portion 440. Accordingly, the movement of the extended support portion 300 is stopped, and thus the adjustment becomes possible to match the width of the bicycle.

On the other hand, as illustrated in FIGS. 1 and 3, the first driving portion 420 of the motor module 400 may include a first motor portion 422 installed on the carrier portion 200 to transfer a rotating power when the signal of the communication control module 500 is input, and a moving link portion 424 extending from the first motor portion 422 and connected to the guide rail 100 to enable the carrier portion 200 to slide in forward and backward directions along the guide rail 100 when the first motor portion 422 operates.

Preferably, a pinion gear P may be formed on the moving link portion 424, and a rack gear R, which extends in the forward and backward directions and is tooth-engaged with the pinion gear P, may be formed on the guide rail 100.

That is, the moving link portion 424 is installed to extend from the first motor portion 422 to both sides of the carrier portion 200 to be rotated when the first motor portion 422 operates. On the extending end portion of the moving link portion 424, the pinion gear P is formed to be tooth-engaged with the rack gear R that is formed on the guide rail 100. When the first motor portion 422 operates, the moving link portion 424 is rotated and thus the pinion gear P is rotated to move over the rack gear R.

In addition, on the guide rail 100, a solenoid S that is selectively connected to the carrier portion 200 to selectively permit the sliding movement of the carrier portion 200 may be provided. If the electricity is applied to the solenoid S under the control of the communication control module 500 during the drawing or accommodating operation of the carrier portion 200, the solenoid S secedes from the carrier portion 200 to enable the carrier portion 200 to move.

On the other hand, as illustrated in FIGS. 1 and 4, the extended support portion 300 may include an extended rail 320 fixedly extending to cross the carrier portion 200 in both side directions of the carrier portion 200, a bicycle support 340 installed on the extended rail 320 to slide, and an extended link portion 360 formed to extend in parallel to the extended rail 320, connected to be movable along a direction in which the bicycle support 340 extends, and connected to the second driving portion 440 of the motor module 400 so as to enable the bicycle support 340 to move along the extended rail 320 when the second driving portion 440 operates.

The extended rail 320 extends to cross both sides of the carrier portion 200 to guide the bicycle support 340 to move in the side direction, and the pair of bicycle supports 340 are symmetrically provided about the center line in the forward and backward directions to spread in both side directions. Accordingly, the bicycle support 340 can be set to match the width of the bicycle.

Here, the extended link portion 360 may be composed of a lead screw, and a lead nut, into which the lead screw is inserted, may be provided on the bicycle support 340, so that the bicycle support 340 and the extended link portion 360 are screw-connected to each other. Accordingly, as the second driving portion 440 operates, the extended link portion 360 is rotated, and the bicycle support 340 can move over screw threads.

In accordance with the present invention, the pair of bicycle supports 340 are symmetrically provided, and the extended link portion 360 is composed of the lead screw having screw threads that are formed in opposite directions from the center in the length direction. Accordingly, even if the extended link portion 360 is rotated in one direction, the pair of bicycle supports 340 become closer to each other or become far apart from each other.

On the other hand, a fixing bracket 120 may be installed to be fixed to the guide rail 100, and a tilting bracket 140 may be positioned in the rear of the fixing bracket 120 and rotatably installed on the bumper back beam 10. Accordingly, the tilting bracket 140 is rotated in a state where the carrier portion 200 is completely drawn out, and thus the carrier portion 200 can be tilted together with the tilting bracket 140.

Here, a solenoid portion 160 may be provided on the fixing bracket 120 and selectively connected to the tilting bracket 140 to selectively permit a rotating operation of the tilting bracket 140. The solenoid portion 160 is controlled by the communication control module 500. Normal times, the solenoid portion 160 is connected to the tilting bracket 140 to limit the rotation thereof, and during the operation thereof, the solenoid portion 160 is released from the tilting bracket 140 and the tilting bracket 140 is rotated together with the carrier portion 200.

For this, the communication control module 500 may further store a tilting command of the carrier portion 200, and make the solenoid portion 160 operate if a signal in accordance with the tilting command is input. That is, the communication control module 500 operates the solenoid portion 160 when the command for the tilting operation of the carrier portion 200 is input to permit the tilting operation of the carrier portion 200.

The communication control module 500 may further include a third relay portion 566 configured to permit or intercept the power that is applied to the solenoid portion 160. By controlling the third relay portion 566, the solenoid portion 160 operates to make the carrier portion 200 perform or limit tilting.

However, in the case where the carrier portion 200 is accommodated in the buffer back beam, the carrier portion 200 is unable to perform the tilting operation. Accordingly, the communication control module 500 outputs a signal in accordance with the tilting command of the carrier portion 200 in a state where the carrier portion 200 is completely drawn out, and thus the tiling operation is performed in a state where the carrier portion 200 is completely drawn out. Through this, the communication control module 500 in accordance with the present invention can automatically control the tiling operation of the carrier portion 200 in addition to the drawing/accommodating operation of the carrier portion 200 and the extending/returning operation of the extended support portion 300, and thus user's convenience can be further improved.

According to the bicycle carrier system for a vehicle having the above-described configuration, since the bicycle carrier is installed on the rear bumper back beam 10 of the vehicle in a manner that the bicycle carrier is not exposed to the outside normal times, but is drawn from the bumper back beam 10 to enable the bicycle to be carried thereon if it is required to carry the bicycle, the exterior design can be maintained and the convenience can be improved.

In particular, since the bicycle carrier is automatically drawn out or accommodated in the bumper back beam 10 and the width of the bicycle carrier is adjusted in both side directions to facilitate the carriage of the bicycle, high quality and convenience can be further improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier system for a vehicle comprising:
   a guide rail substantially symmetrically provided on a bumper back beam and formed to extend in forward and backward directions;
   a carrier portion connected to the guide rail to be slidably drawn out or accommodated along the guide rail;
   an extended support portion installed on the carrier portion to extend or return in both side directions and formed to carry a bicycle thereon;
   a motor module installed on the carrier portion and including a first driving portion connected to the guide rail to enable the carrier portion to move along the guide rail and a second driving portion connected to the extended support portion to extend or return the extended support portion; and
   a communication control module configured to store a drawing or accommodating command of the carrier portion and an extending or returning command of the extended support portion and to control operation of the first driving portion and the second driving portion in accordance with an input signal in accordance with a specific command.

2. The bicycle carrier system of claim 1, wherein the communication control module comprises:
   a communication portion configured to output signals in accordance with the drawing or accommodating command of the carrier portion and the extending or returning command of the extended support portion; and
   a control portion configured to receive the signals output from the communication portion and to selectively control application of a power to the first driving portion and the second driving portion in accordance with the input signal.

3. The bicycle carrier system of claim 2, wherein the communication control module further comprises a first relay portion and a second relay portion provided between the control portion and the first and second driving portions, respectively, to permit or intercept the power that is applied to the first driving portion or the second driving portion in accordance with a command signal of the control portion.

4. The bicycle carrier system of claim 3, wherein the control portion of the communication control module controls the first relay portion to permit the power that is applied to the first driving portion if the signal in accordance with the drawing or accommodating command of the carrier portion is input through the communication portion and to intercept the power that is applied to the first driving portion if the signal in accordance with the drawing or accommodating command of the carrier portion is not input.

5. The bicycle carrier system of claim 3, wherein the control portion of the communication control module controls the second relay portion to permit the power that is applied to the second driving portion if the signal in accordance with the extending or returning command of the extended support portion is input and to intercept the power that is applied to the second driving portion if the signal in accordance with the extending or returning command of the extended support portion is not input.

6. The bicycle carrier system of claim 1, wherein the first driving portion of the motor module comprises:
   a first motor portion installed on the carrier portion to transfer a rotating power when the signal of the communication control module is input; and
   a moving link portion extending from the first motor portion and connected to the guide rail to enable the carrier portion to slide in forward and backward directions along the guide rail when the first motor portion operates.

7. The bicycle carrier system of claim 1, wherein the extended support portion comprises:
   an extended rail fixedly coupled to the carrier portion and extending to cross the carrier portion in both side directions of the carrier portion;
   a bicycle support installed on the extended rail to slide; and
   an extended link portion formed to extend in parallel to the extended rail, connected to be movable along a direction in which the bicycle support extends, and connected to the second driving portion of the motor module so as to enable the bicycle support to move along the extended rail when the second driving portion operates.

8. The bicycle carrier system of claim 1, wherein a fixing bracket is fixedly installed to the guide rail, and a tilting bracket is positioned in a rear of the fixing bracket and rotatably installed on the bumper back beam.

9. The bicycle carrier system of claim 8, wherein a solenoid portion is provided on the fixing bracket and selectively connected to the tilting bracket to selectively permit a rotating operation of the tilting bracket.

10. The bicycle carrier system of claim 9, wherein the communication control module further stores a tilting command of the carrier portion, and controls operation of the solenoid portion if a signal in accordance with the tilting command is input.

11. The bicycle carrier system of claim 10, wherein the communication control module further comprises a third relay portion configured to permit or intercept the power that is applied to the solenoid portion.

12. The bicycle carrier system of claim 10, wherein the communication control module outputs the signal in accordance with the tilting command of the carrier portion in a state where the carrier portion is completely drawn.

* * * * *